US009395805B2

United States Patent
Stenfort

(10) Patent No.: US 9,395,805 B2
(45) Date of Patent: Jul. 19, 2016

(54) DEVICE SLEEP PARTITIONING AND KEYS

(71) Applicant: LSI Corporation, San Jose, CA (US)

(72) Inventor: Ross Stenfort, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 269 days.

(21) Appl. No.: 13/874,590

(22) Filed: May 1, 2013

(65) Prior Publication Data

US 2014/0281627 A1 Sep. 18, 2014

Related U.S. Application Data

(60) Provisional application No. 61/789,337, filed on Mar. 15, 2013.

(51) Int. Cl.
*G06F 1/32* (2006.01)
*G06F 21/74* (2013.01)
*G06F 21/78* (2013.01)

(52) U.S. Cl.
CPC ............ *G06F 1/3287* (2013.01); *G06F 1/3268* (2013.01); *G06F 21/74* (2013.01); *G06F 21/78* (2013.01); *G06F 2221/2105* (2013.01); *Y02B 60/1246* (2013.01); *Y02B 60/1282* (2013.01); *Y02B 60/32* (2013.01)

(58) Field of Classification Search
CPC ........... G06F 1/32; G06F 21/00; G06F 21/60; H04L 9/0822
USPC ........................................................ 713/323
See application file for complete search history.

(56) References Cited

U.S. PATENT DOCUMENTS

| 6,021,500 | A | * | 2/2000 | Wang et al. ................... 713/320 |
| 8,700,935 | B2 | * | 4/2014 | Mikami ................ G06F 1/3203 713/300 |
| 9,141,299 | B2 | * | 9/2015 | Grimsrud .............. G06F 1/3287 |
| 2003/0196137 | A1 | * | 10/2003 | Ahmad et al. ................... 714/13 |
| 2004/0243868 | A1 | * | 12/2004 | Toll et al. ....................... 713/323 |
| 2005/0182970 | A1 | * | 8/2005 | Yasaki .......................... 713/201 |
| 2005/0262361 | A1 | * | 11/2005 | Thibadeau .............. G06F 21/80 713/193 |
| 2008/0270657 | A1 | * | 10/2008 | Tsai ....................... G06F 3/0611 710/114 |
| 2009/0204823 | A1 | * | 8/2009 | Giordano et al. ............. 713/190 |
| 2009/0262929 | A1 | | 10/2009 | Walmsley |
| 2011/0099384 | A1 | * | 4/2011 | Grange et al. ................ 713/184 |
| 2012/0022925 | A1 | * | 1/2012 | Chen ..................... G06F 9/4418 705/14.4 |
| 2012/0179927 | A1 | * | 7/2012 | Sodhi et al. .................... 713/323 |
| 2012/0226927 | A1 | * | 9/2012 | Kagan ................... G06F 1/3203 713/323 |
| 2014/0068302 | A1 | * | 3/2014 | Falik et al. ..................... 713/323 |
| 2014/0129759 | A1 | * | 5/2014 | Sauber .................. G06F 1/3287 711/103 |

* cited by examiner

*Primary Examiner* — Vincent Tran
(74) *Attorney, Agent, or Firm* — Suiter Swantz pc llo

(57) ABSTRACT

A data storage device includes a device sleep state pin and device sleep state logic to allow the data storage device to store security keys and necessary device sleep state logic together in a volatile logical data storage element. The volatile logical data storage element may be on-chip or off-chip. Device sleep state logic parameters for powering down PHYs while in a device sleep state determine the power characteristics of the device sleep state.

17 Claims, 3 Drawing Sheets

# DEVICE SLEEP PARTITIONING AND KEYS

PRIORITY

The present application claims the benefit under 35 U.S.C. §119(e) of U.S. Provisional Application Ser. No. 61/789,337, filed Mar. 15, 2013, which is incorporated herein by reference.

BACKGROUND OF THE INVENTION

Serial advanced technology attachment input/output increasingly operates in the lowest possible power state, frequently entering a low power, or "device sleep" state. When a device is told to wake up it should wake up quickly and behave as it did before entering the low power state. Thus the device must maintain context across this low power state. Storing security keys in flash during a low power state creates security concerns and problems based on the need to erase flash. Storing security keys in dynamic random access memory is a problem because a typical external dynamic random access memory consumes too much power for a low power state system.

Consequently, it would be advantageous if an apparatus existed that is suitable for storing security keys in a low power, volatile data storage element.

SUMMARY OF THE INVENTION

Accordingly, the present invention is directed to a novel method and apparatus for storing security keys in a low power, volatile memory.

In at least one embodiment, a data storage device, such as a solid state drive or hard disk drive, receives a sleep signal from a host. The data storage device then isolates a portion of a logical, volatile data storage element, such as in a processor, and stores security keys and device sleep state logic in the isolated a portion of a logical, volatile data storage element. The data storage device then powers down device elements to enter a low power state.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Serial Advanced Technology Attachment data storage devices according to at least one embodiment of the present invention are built with a device sleep control pin. The functionality of the device sleep control pin is to put a device into device sleep state. In device sleep state and security keys need to be saved somewhere. Keeping security keys in external dynamic random access memory is undesirable because the dynamic random access memory consumes too much power to be consistent with a low power device sleep state. Keeping the security keys in flash is undesirable because flash tends to maintain data until it is specifically overwritten; so either the security keys are not immediately erased or the flash will be worn out prematurely. Thus storing the security keys and device sleep state logic together is very desirable from a power and security perspective.

Figure 1:
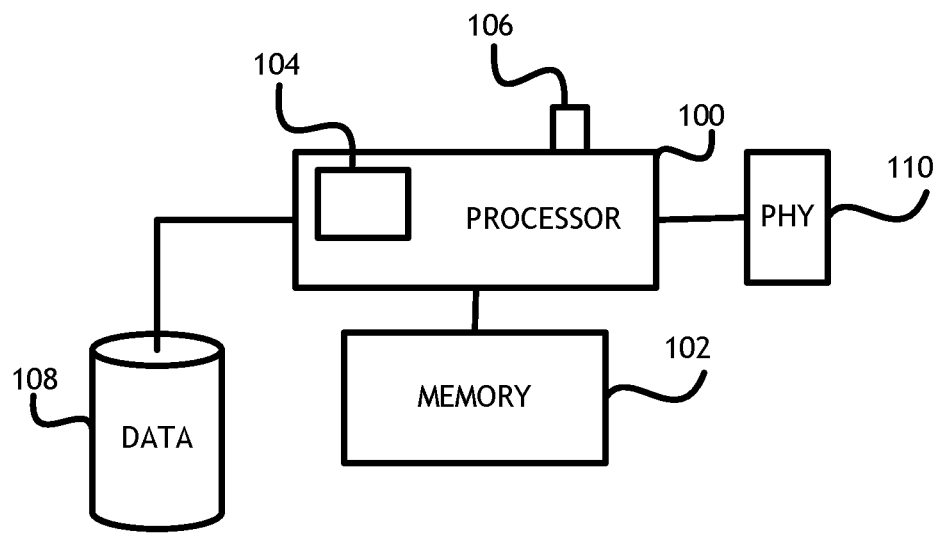
FIG. 1 shows a block diagram of a system useful for implementing embodiments of the present invention.

Referring to FIG. 1, a block diagram of a system useful for implementing embodiments of the present invention is shown. In at least one embodiment of the present invention, a system such as a solid state drive or a hard disk drive includes a processor 100, memory 102 connected to the processor 100 and a data store 108 connected to the processor 100. The processor 100 is connected to a device sleep pin 106, accessible by a host. In at least one embodiment of the present invention, the system includes at least one PHY 110 connected to the processor 100. PHYs 110 allow other machines to access the data store 108.

A host controller sends a signal through the device sleep pin 106, to the processor 100, instructing the processor 100 to put the system into a device sleep state. The device sleep state enables a Serial Advanced Technology Attachment device to enter an ultra-low interface power state. In at least one embodiment, the device sleep state completely powers down the device PHYs. The capability of a device to enter the device sleep state disclosed herein is determined by a "set features" command; although other methods could be used to enable this mode.

When the device sleep pin 106 receives a device sleep signal, the processor 100 stores any security keys necessary to access data from the data store 108 together with the device sleep state logic in a logical data structure 104 or "island of logic." Keeping the security keys and device sleep state logic together is secure and allows for fast wakeup. The logical data structure 104 is a volatile data storage element, meaning that while the security keys are quickly accessible to the processor 100, they will be lost if the processor 100 powers down. The data storage element is a memory block in the processor 100, flops, gates or any other mechanism suitable for volatile, low-power data storage.

In at least one embodiment of the present invention, security keys and device sleep state logic are kept together in the same domain; that domain may be on-chip or off-chip. In at least one embodiment, the device sleep state logic includes a parameter indicating whether a device has entered a device sleep state or has powered down.

In at least one embodiment, a host asserts a device sleep state for a device. Either a host or device may include logic to prevent assertion of a device sleep state until all of one or more parameters are satisfied. For example, a device should not enter a device sleep state until all commands have been executed and all active registers are cleared. Furthermore, where a host has asserted a device sleep state for a device, the host should not initiate communication with the device before the device has been woken-up and should ignore any communication from the device.

In at least one embodiment of the present invention, device sleep state logic includes checks to ensure certain device sleep state parameters have been met. For example, a device should not enter a device sleep state until device sleep state logic in the device determines that all outstanding commands have been executed.

Figure 2:
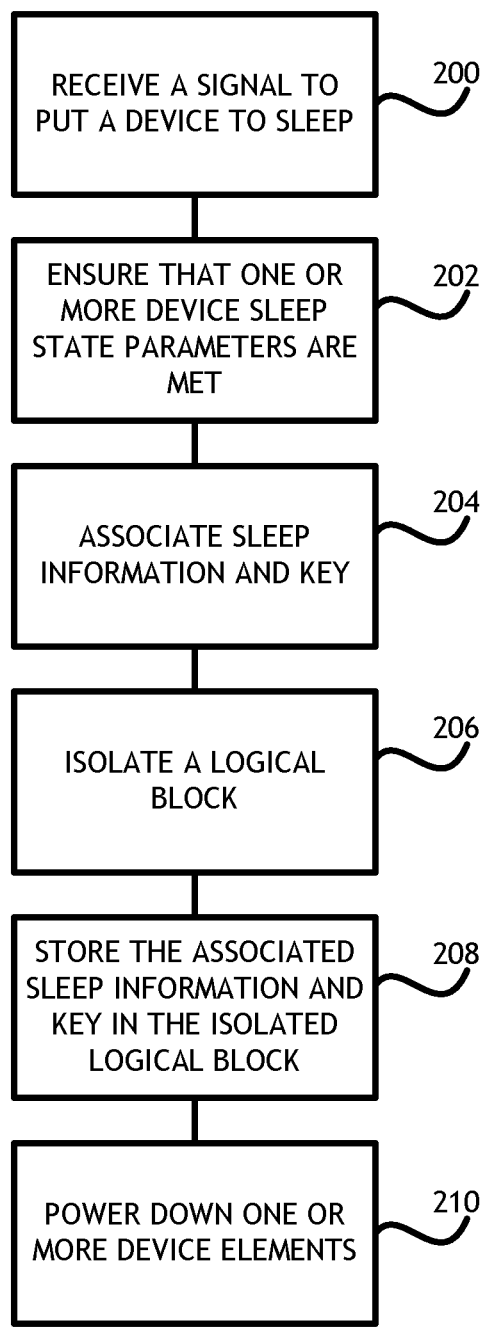
FIG. 2 shows a flowchart of a method for initiating a device sleep state in a system according to embodiments of the present invention.

Referring to FIG. 2, a flowchart of a method for initiating a device sleep state in a system according to embodiments of the present invention is shown. In at least one embodiment of the present invention, a data storage device such as a Serial Advanced Technology Attachment (SATA) storage device receives 200 a signal to enter a low power device sleep state. The data storage device ensures 202 that certain device sleep state parameters are met; for example, the data storage device ensures that all outstanding commands have been executed. Alternatively, a host device that issued the signal to enter a device sleep state ensures 202 that all such parameters are met.

The data storage device associates 204 at least one security key with device sleep state information in an appropriate data structure and isolates 206 a portion of a logical, volatile data storage element, such as in a memory block in processor, flops, gates or any other mechanism suitable for volatile, low-power data storage. The data storage device then stores 208 the associated security keys and device sleep state information in the isolated portion of logical, volatile data storage element and enters a device sleep state. Storing security keys in a portion of logical, volatile data storage element allows the data storage device to enter a low power state without storing security keys in a powered memory element such as dynamic random access memory, and without placing security keys in a persistent memory such as flash, where erasure operations are likely to degrade the memory prematurely.

In at least one embodiment, a data storage device entering a device sleep state powers down 210 one or more associated device elements. For example, where the data storage device includes one or more PHYs, the one or more PHYs are powered down 210.

Figure 3:
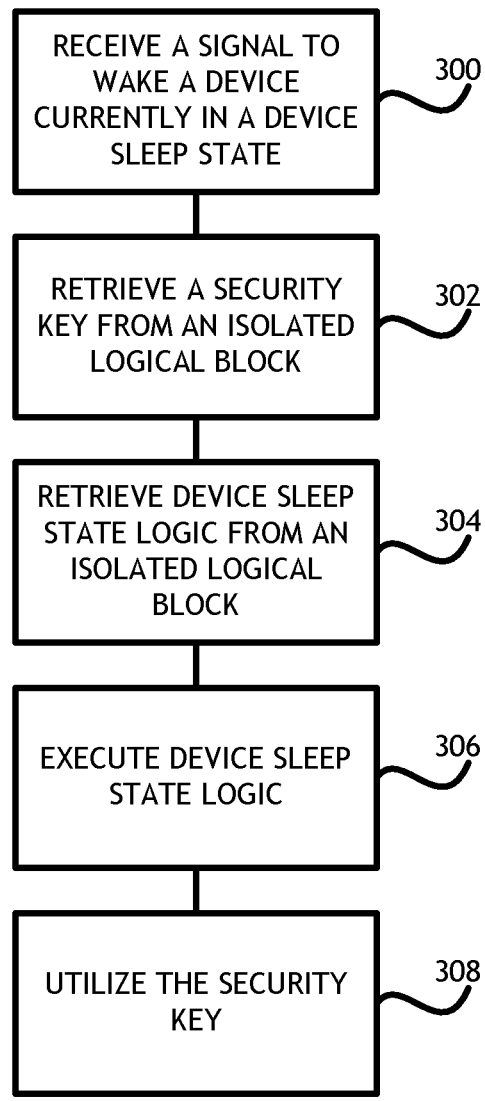
FIG. 3 shows a flowchart of a method for waking a data storage device from a device sleep state according to embodiments of the present invention.

Referring to FIG. 3, a flowchart of a method for waking a data storage device from a device sleep state according to embodiments of the present invention is shown. In at least one embodiment of the present invention, a device such as a Serial Advanced Technology Attachment (SATA) data storage device receives 300 a signal to exit a low power device sleep state. The data storage device retrieves 302 one or more security keys from an isolated portion of a logical, volatile data storage element, such as in a memory block in processor, flops, gates or any other mechanism suitable for volatile, low-power data storage. In at least one embodiment, the data storage device retrieves 304 device sleep state information from the isolated portion of the logical, volatile data storage element.

In at least one embodiment, the data storage device uses or executes 306 a portion of the device sleep state logic during the wake-up process. The data storage device then uses 308 the security keys to re-establish access to data and host devices.

In at least one embodiment, a data storage device exiting a device sleep state powers up one or more associated device elements. For example, where the data storage device includes one or more PHYs, the one or more PHYs are powered up to send and receive data traffic to connected devices.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A data storage device system comprising:
a processor including a volatile data storage element;
a device sleep state pin connected to the processor;
a memory connected to the processor;
a data storage device connected to the processor; and
computer executable program code configured to execute on the processor,
wherein:
the data storage device is a serial advanced technology attachment (SATA) device; and
the computer executable program code is configured to:
isolate a portion of the volatile data storage element;
receive a device sleep signal through the device sleep state pin;
associate device sleep state information corresponding to the data storage device with one or more security keys; and
store the one or more security keys and device sleep state information in a logical data structure in the volatile data storage element.

2. The data storage device system of claim 1, wherein the computer executable program code is further configured to store data corresponding to device sleep state logic in the logical data structure.

3. The data storage device system of claim 1, further comprising at least one PHY connected to the processor, wherein the computer executable program code is further configured to power down the at least one PHY when a device sleep signal is received.

4. The data storage device system of claim 1, wherein the computer executable program code is further configured to:
receive a wake-up signal; and
retrieve the one or more security keys from the logical data structure.

5. The data storage device system of claim 4, wherein the computer executable program code is further configured to:
retrieve data corresponding to device sleep state logic in the logical data structure; and
execute at least a portion of the data corresponding to the device sleep state logic.

6. A method for entering a tow power state in data storage device comprising:
receiving a device steep signal through a dedicated device steep state pin;
preventing a device from entering a steep state white at least one of one or more parameters for entering a steep state has not been satisfied,
the one or more parameters including all active registers being cleared;
determining that all of the one or more parameters for entering a steep state have been satisfied;
isolating a portion of a volatile data storage element disposed in a processor comprising one of flops or logical gates;
associate device sleep state information corresponding to the data storage device with one or more security keys; and storing one or more security keys in a logical data structure in the volatile data storage element.

7. The method system of claim 6, further comprising storing data corresponding to device sleep state logic in the logical data structure.

8. The method system of claim 6, further comprising powering down at least one PHY when the device sleep signal is received.

9. The method system of claim 6, further comprising:
receiving a wake-up signal; and
retrieving the one or more security keys from the logical data structure.

10. The method system of claim 9, further comprising:
retrieving data corresponding to device sleep state logic in the logical data structure; and
executing at least a portion of the data corresponding to the device sleep state logic.

11. The method system of claim 9, further comprising powering up at least one PHY when the wake-up signal is received.

12. A computer apparatus comprising:
a processor including a volatile data storage element;
a device sleep state pin connected to the processor;
a memory connected to the processor; and
computer executable program code configured to execute on the processor,
wherein:
the computer apparatus is a serial advanced technology attachment (SATA) device; and
the computer executable program code is configured to:
receive a device sleep signal through the device sleep state pin;
prevent the computer apparatus from entering a sleep state while at least one of one or more parameters for entering a sleep state has not been satisfied, the one or more parameters including all active registers being cleared;
determine that all of the one or more parameters for entering a sleep state have been satisfied;
isolate a portion of the volatile data storage element;
associate device sleep state information corresponding to the computer apparatus with one or more security keys; and
store one or more security keys in a logical data structure in the volatile data storage element.

13. The computer apparatus system of claim 12, wherein the computer executable program code is further configured to store data corresponding to device sleep state logic in the logical data structure.

14. The computer apparatus system of claim 12, wherein the computer executable program code is further configured to:
receive a wake-up signal; and
retrieve the one or more security keys from the logical data structure.

15. The computer apparatus system of claim 14, wherein the computer executable program code is further configured to:
retrieve data corresponding to device sleep state logic in the logical data structure; and
execute at least a portion of the data corresponding to the device sleep state logic.

16. The computer apparatus system of claim 12, further comprising at least one PHY connected to the processor, wherein the computer executable program code is further configured to power down the at least one PHY when the device sleep signal is received.

17. The computer apparatus system of claim 12, further comprising a host processor configured to send a device sleep signal to the device sleep state pin, wherein the host processor is configured to:
assert that a device enters a device sleep state; and
power down one or more PHYs associated with the host processor.

* * * * *